US010672190B2

(12) United States Patent
McBeth

(10) Patent No.: US 10,672,190 B2
(45) Date of Patent: Jun. 2, 2020

(54) CUSTOMIZING APPEARANCE IN MIXED REALITY

(71) Applicant: Microsoft Technology Licensing, LLC, Redmond, WA (US)

(72) Inventor: Sean Kenneth McBeth, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/726,333

(22) Filed: Oct. 5, 2017

(65) Prior Publication Data

US 2019/0108681 A1    Apr. 11, 2019

(51) Int. Cl.
| | |
|---|---|
| *G06T 19/00* | (2011.01) |
| *G06T 15/00* | (2011.01) |
| *G06T 17/20* | (2006.01) |
| *G06T 19/20* | (2011.01) |
| *G06F 3/00* | (2006.01) |

(52) U.S. Cl.
CPC .......... *G06T 19/006* (2013.01); *G06T 15/005* (2013.01); *G06T 17/205* (2013.01); *G06T 19/20* (2013.01); *G06F 3/005* (2013.01); *G06T 2210/16* (2013.01); *G06T 2215/16* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 8,213,680 | B2* | 7/2012 | Fitzgibbon | ......... G06K 9/00335 348/169 |
| 8,743,145 | B1* | 6/2014 | Price | ..................... G06T 19/006 345/633 |
| 2007/0024527 | A1 | 2/2007 | Heikkinen et al. | |
| 2009/0271821 | A1* | 10/2009 | Zalewski | ................ A63F 13/12 725/37 |
| 2011/0292179 | A1* | 12/2011 | Hernandez | ........... G01B 11/245 348/46 |
| 2012/0306919 | A1* | 12/2012 | Suzuki | ............... G06Q 30/0643 345/633 |

(Continued)

FOREIGN PATENT DOCUMENTS

| | | |
|---|---|---|
| EP | 2081144 A1 | 7/2009 |
| EP | 2775456 A2 | 9/2014 |

OTHER PUBLICATIONS

Anguelov, et al., "SCAPE: Shape Completion and Animation of People", In Journal of ACM Transactions on Graphics, vol. 24, Issue 3, Jul. 31, 2005, pp. 408-416.

(Continued)

*Primary Examiner* — Xiao M Wu
*Assistant Examiner* — Steven Z Elbinger

(57) ABSTRACT

Techniques for customizing appearance in mixed reality are provided. According to one set of embodiments, an electronic device configured to enable mixed reality (i.e., a mixed reality device) can detect presence of a real-world individual in a field of view of the device and determine whether the individual is associated with one or more appearance customizations. If so, the mixed reality device can render the one or more appearance customizations on top of, or nearby, the individual on a display of the device.

18 Claims, 5 Drawing Sheets

(56) References Cited

U.S. PATENT DOCUMENTS

| | | | |
|---|---|---|---|
| 2013/0097194 A1* | 4/2013 | Braga | G06F 17/30256 |
| | | | 707/758 |
| 2013/0147837 A1 | 6/2013 | Stroila | |
| 2014/0253548 A1* | 9/2014 | Schmidt | G06T 17/10 |
| | | | 345/420 |
| 2015/0279117 A1* | 10/2015 | Schimke | G06F 21/32 |
| | | | 345/633 |
| 2016/0088284 A1* | 3/2016 | Sareen | G06N 3/006 |
| | | | 348/47 |
| 2016/0267717 A1* | 9/2016 | Bar-Zeev | G02B 27/017 |
| 2018/0117470 A1* | 5/2018 | Chiu | A63F 13/577 |
| 2018/0174363 A1* | 6/2018 | VanBlon | G06T 19/006 |
| 2018/0373412 A1* | 12/2018 | Reif | G06F 3/04815 |

OTHER PUBLICATIONS

"International Search Report and Written Opinion Issued in PCT Application No. PCT/US18/054048", dated Apr. 25, 2019, 16 Pages.

* cited by examiner

CUSTOMIZING APPEARANCE IN MIXED REALITY

BACKGROUND

Mixed reality, also known as hyper reality, refers to the integration of physical (i.e., real-world) and virtual (i.e., computer-generated) objects in an environment presented to a user such that the physical and virtual objects appear to co-exist and affect/influence each other in real-time. Mixed reality is typically enabled via a wearable or mobile device that includes a camera for capturing the user's real-world surroundings and a display for presenting the mixed reality environment to the user. Examples of such devices include headsets, smartphones, smartglasses, and the like.

In many mixed reality applications, a user that is wearing/using a mixed reality device will observe and interact with other real-world individuals, such as people within the vicinity of the device user, as part of the mixed reality experience provided by the application. Accordingly, it would be desirable to have features that leverage mixed reality to enrich these person-to-person interactions.

SUMMARY

Techniques for customizing appearance in mixed reality are provided. According to one set of embodiments, an electronic device configured to enable mixed reality (i.e., a mixed reality device) can detect presence of a real-world individual in a field of view of the device and determine whether the individual is associated with one or more appearance customizations. If so, the mixed reality device can render the one or more appearance customizations on top of, or nearby, the individual on a display of the device.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques that can be implemented by a mixed reality device for customizing the appearance of real-world individuals that appear in mixed reality environments presented via the device. At a high level, these techniques include detecting, by the mixed reality device, the presence of an individual in the device's field of view and determining whether the individual is associated with one or more appearance customizations. As used herein, an "appearance customization" is a digital item, object, or visual effect that can be used to alter the appearance of the individual. In various embodiments, the individual can select/define the appearance customizations that he/she wishes to be associated with via a self-service user interface (e.g., a web portal or a mobile application) and these customizations can be saved on one or more servers that are communicatively coupled with the mixed reality device.

If the mixed reality device determines that the individual is not associated with any appearance customizations, the device user can view the individual as he/she appears in the real world. However, if the mixed reality device determines that the individual is associated with one or more appearance customizations, the device can render, using computer graphics techniques, the appearance customization(s) on top of (or substantially close to) the individual on the device's display. In this way, the mixed reality device can alter the individual's appearance to the device user in accordance with the customizations that the individual has selected/defined.

In one set of embodiments, the appearance customizations can include wearable items, such as clothing (e.g., shirts, pants, etc.) and accessories (e.g., hats, jewelry, glasses, etc.). In these embodiments, the mixed reality device can render the wearable customizations in a manner that ensures the customizations properly fit and conform to the body of the individual. In another set of embodiments, the appearance customizations can include objects (e.g., spirits, animals, etc.) or visual effects (e.g., auras, glows, halos, etc.) that are designed to float around the individual. In these embodiments, the mixed reality device can render the floating customizations in a manner that ensures the customizations follow the individual at a proper distance/offset and interact appropriately with the environment (e.g., move out of the way of environmental obstacles, etc.).

The foregoing and other aspects of the present disclosure are described in further detail below.

2. System Environment

Figure 1:
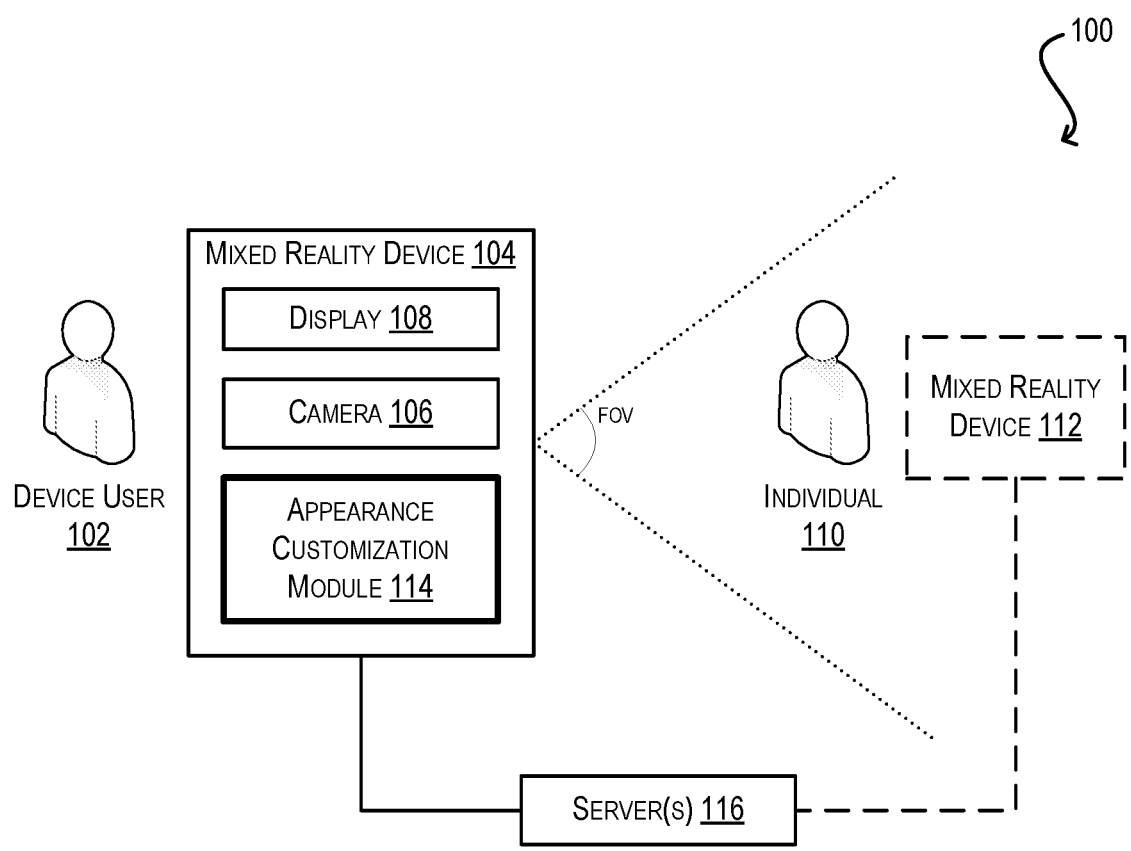
FIG. 1 is a simplified block diagram of a system environment according to certain embodiments.

FIG. 1 is a simplified block diagram of a system environment 100 in which embodiments of the present disclosure may be implemented. As shown, system environment 100 includes a user 102 (referred to as a "device user") operating a mixed reality device 104 for the purpose of engaging in a mixed reality experience provided by device 104. Mixed reality device 104 may be, e.g., a headset, a pair of smartglasses, a smartphone, a tablet, or any other type of electronic device that is capable of capturing a real-time video feed of its real-world surroundings via a camera 106 and enabling device user 102 to view these surroundings, along with virtual elements/objects, on or through a display 108.

In one set of embodiments, display 108 may be a transparent display which device user 102 can see through to view his or her real-world surroundings. In these cases, virtual objects may be rendered on the display in a manner that causes those objects to overlap the user's view of the real world. In other embodiments, display 108 may be a non-transparent display, such as a conventional OLED or LCD screen. In these cases, mixed reality device 104 may composite virtual objects into the real-time video feed captured via camera 106 and present this video feed on display 108 to device user 102.

As noted in the Background section, in many mixed reality experiences/applications, device user 102 may view and interact with other real-world individuals, such as individual 110, that are within the field of view of device 104 and thus are visible to device user 102 via display 108. For instance, if mixed reality device 104 is configured to provide a mixed reality social experience, as part of the experience device user 102 may view and interact with real-world individual 110, along with the virtual avatars of other remote individuals, in a virtual social space (note that individual 110 may also operate his or her own mixed reality device 112 (shown as being optional via dashed lines) in order to visualize and participate in the experience). In this and other similar scenarios, it would be desirable for real-world participants 102 and 110 to be able to express their individuality through personal customizations that are visible to each other.

To meet this need, mixed reality device 104 is enhanced to include an appearance customization module 114 as shown in FIG. 1. Appearance customization module 114 is a software component that, in the example of FIG. 1, may be implemented within the operating system (OS) of device 104, as a library shared by a number of mixed reality applications running on device 104, or as a part of a specific mixed reality application.

As detailed in the sections that follow, appearance customization module 114 can enable mixed reality device 104 to determine and render computer graphics-based (i.e., CGI) appearance customizations for individual 110 that have been selected/defined by individual 110. Examples of such appearance customizations include clothing, fashion accessories, follower animals/objects, full-body auras, halos, tattoos, and the like. These appearance customizations may be maintained on one or more servers 116 and downloaded to mixed reality device 104 as needed.

Mixed reality device 104 can then present the rendered customizations on top of individual 110 (if a wearable customization) or nearby individual 110 (if a floating customization) within display 108 to device user 102, thereby allowing device user 102 to visualize individual 110 with these customizations in place. In the case of wearable customizations, they can be fit to the body size, shape, and movement of individual 110 to provide the illusion that individual 110 is, in fact, wearing the customizations. In the case of floating customizations, they can be rendered to follow individual 110 appropriately and to provide the illusion that they actually exist in the environment (by, e.g., navigating around environmental obstacles and so on).

With this appearance customization capability, users can advantageously control how they appear in mixed reality environments and thus express their personal style and preferences in a visual way to other mixed reality users. This is particularly useful in social applications where such personal expression in an inherent part of the experience, as well as in video games where users may want to assume the identities of in-game characters.

In addition, appearance customization can help keep users engaged with mixed reality applications by encouraging the users to build a large and diverse customization collection over time. In some embodiments, users may be awarded certain appearance customizations by completing in-application activities or goals. In other embodiments, certain appearance customizations may be sold via micro-transactions, thereby providing an additional stream of revenue to the application developer.

It should be appreciated that FIG. 1 and its accompanying description are illustrative and not intended to limit embodiments of the present disclosure. For example, although appearance customization module 114 is shown as being implemented solely on mixed reality device 104 of user 102, an instance of this module may also be implemented on mixed reality device 112 of individual 110 (as well as on the mixed reality devices of other individuals in the environment), thereby enabling all such users to view appearance customizations with respect to each other.

Further, although appearance customization module 114 is shown as being an integral part of mixed reality device 104, in certain embodiments module 114 may be implemented on another device or system that is separate from, but communicatively coupled with, mixed reality device 104. For example, if mixed reality device 104 is a headset or a pair of smart glasses, some or all of the computational work attributed to appearance customization module 114 (e.g., detection of individual 110, rendering of customizations, etc.) may be performed by a separate smartphone, laptop computer, desktop computer, video game console, cloud-based server, etc. and the results of those computations may be streamed to mixed reality device 104 (rather than being performed on device 104 itself). This configuration reduces the amount of compute resources needed on mixed reality device 104, which can be useful if device 104 is a low-profile and/or low-power (e.g., battery powered) device.

Yet further, although appearance customization module 114 is described above (and in the following sections) as allowing device user 102 to view the appearance customizations of others (i.e., individuals that are not the device user), the same general principles may also be used to allow device user 102 view his or her own appearance customizations. For example, assume device user 102 has selected a shirt customization that he/she should be seen as wearing while in mixed reality. In this case, when device user 102 looks down at his/her body using mixed reality device 104, the device can render this shirt customization over the user's torso. Thus, the techniques of the present disclosure can enable appearance customization with respect to the device user himself/herself, in addition to others. One of ordinary skill in the art will recognize other variations, modifications, and alternatives.

3. High-Level Customization Workflow

Figure 2:
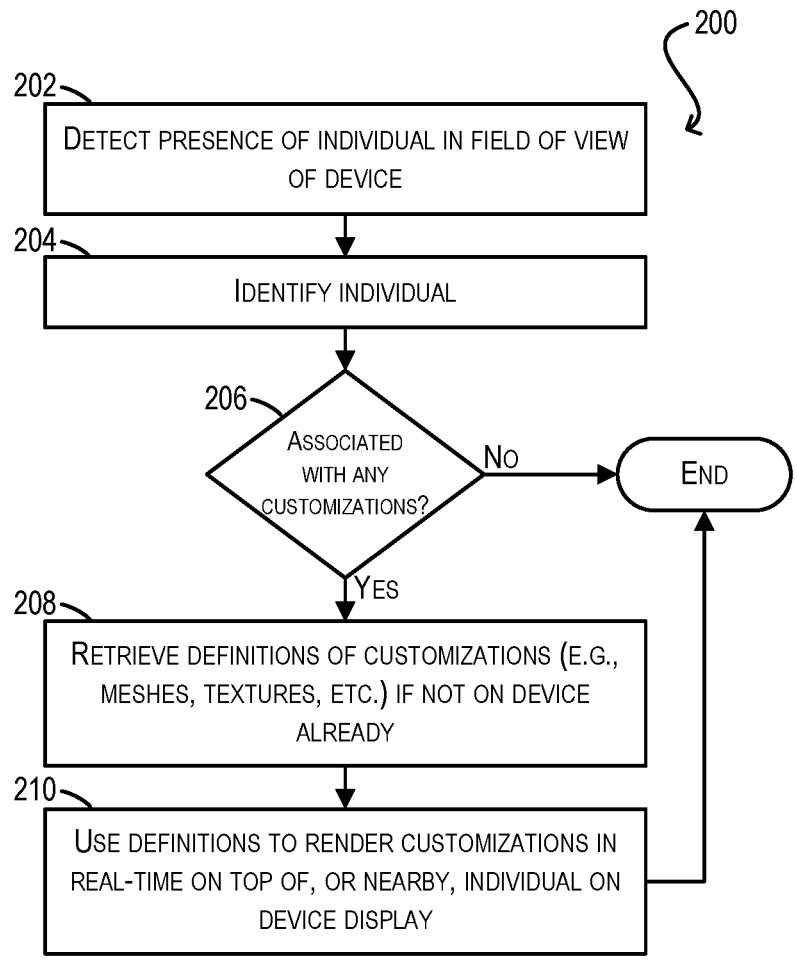
FIG. 2 depicts a high-level appearance customization workflow according to certain embodiments.

FIG. 2 depicts a high-level workflow 200 that can executed by mixed reality device 104 of FIG. 1 (using appearance customization module 114) for customizing the appearance of individual 110 to device user 102 according to certain embodiments. Workflow 200 assumes that individual 110 has selected or defined one or more such customizations via a user interface (e.g., a web portal or mobile application) and that these customizations have been saved on server(s) 116.

At block 202, mixed reality device 104 can first detect the presence of individual 110 in the field of view of the device. This step can be accomplished by applying one or more known image processing techniques for detecting a human face or figure on the images/video captured via camera 106.

Upon detecting the presence of individual 110, mixed reality device 104 can attempt to identify the individual (in other words, determine a unique name or identifier (ID) of the individual) (block 204). In one set of embodiments, mixed reality device 104 can perform this identification via a facial recognition algorithm that is run locally on device 104 or remotely on one or more servers (e.g., server(s) 116). In another set of embodiments, mixed reality device 104 can perform this identification by communicating with mixed reality device 112 operated by individual 110. For example, device 104 may send (via, e.g., a near-field communication channel such as Bluetooth) a request to device 112 for individual 110's identity, and device 112 can respond with a unique user ID or name of the individual.

Assuming the identification at block 204 is successful, mixed reality device 104 can determine whether individual 110 is a user that is associated with one or more appearance customizations (block 206). This can comprise communicating the user ID or name determined at block 204 to server(s) 116 and receiving a positive or negative response based on whether the user ID/name is found in the server(s)' appearance customization database. If mixed reality device 104 determines that individual 110 is not associated with any appearance customizations (or is an unknown/unregistered user), device 104 can terminate workflow 200 and thus refrain from altering the appearance of individual 110 to device user 102 on display 108.

However, if mixed reality device 104 determines that individual 110 is associated with one or more appearance customizations, device 104 can retrieve definitions of the associated customizations (e.g., 3D meshes, textures, etc.) from server(s) 116 (block 208), if they have not yet been retrieved already. As part of this step, mixed reality device 104 may locally cache the retrieved definitions so that they can be more quickly accessed in the future.

Finally, at block 210, mixed reality device 104 can use the definitions to render the appearance customizations in real-time on top of, or floating near, individual 110 on display 108. In this way, mixed reality device 104 can provide device user 102 the illusion that individual 110 is wearing or otherwise linked with the appearance customizations in the mixed reality environment.

For wearable customizations such as clothing and accessories, the rendering performed at block 210 can leverage skeletal tracking techniques to track, in real-time, the body movement of individual 110 and dynamically adjust the positioning/deformation of the customizations so that they appear to be properly overlaid on the individual as he/she moves through the environment. In addition, mixed reality device 104 can scale the wearable customizations so that they match the body proportions of the individual. This process is described in section (4) below.

For floating customizations such as follower objects and body effects, the rendering performed at block 210 can involve positioning the customizations at an appropriate offset from individual 110 and dynamically adjusting their movement paths to smoothly follow individual 110 and to avoid environmental obstacles. This process is described in section (5) below.

4. Rendering Wearable Customizations

Figure 3:
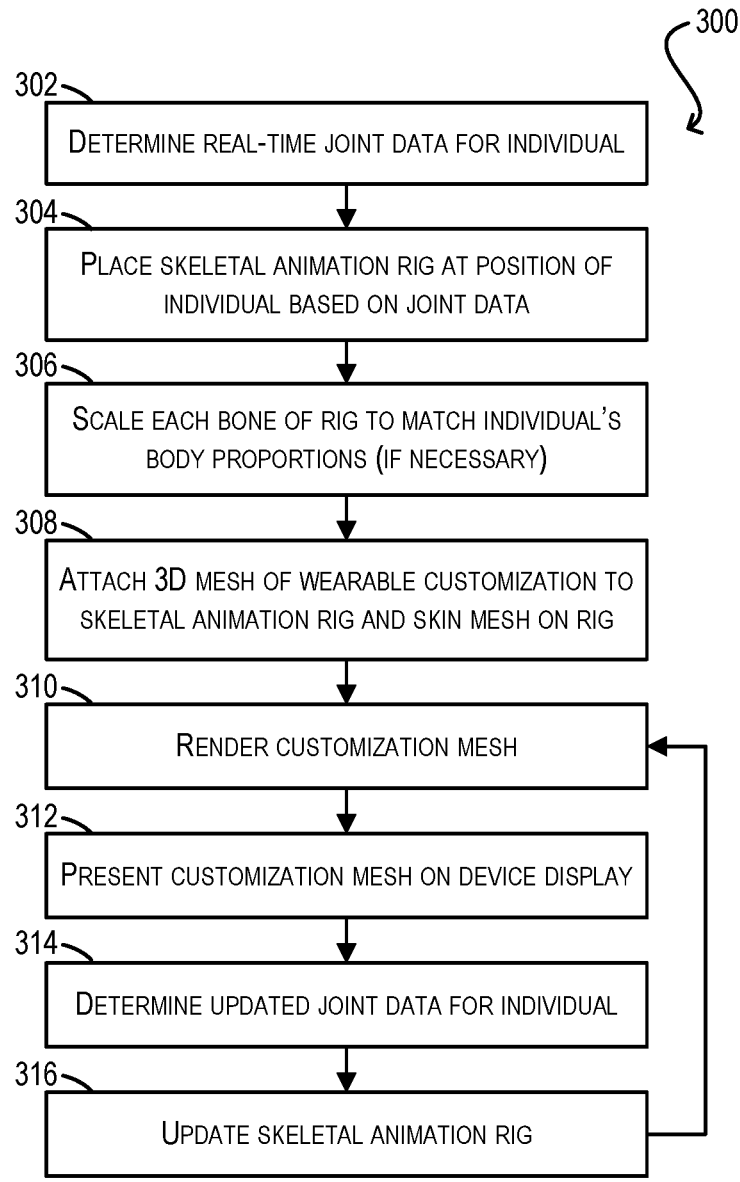
FIG. 3 depicts a workflow for rendering wearable customizations according to certain embodiments.

FIG. 3 depicts a workflow 300 that can be performed by mixed reality device 104 for rendering a wearable customization for individual 110 (per block 210 of FIG. 2) according to certain embodiments.

Starting with block 302, mixed reality device 104 can determine real-time joint data for individual 110, where the joints are points on individual 110's body that map to corresponding joints on a humanoid skeletal animation rig. This real-time joint data indicates the current location and pose of individual 110's body. In one set of embodiments, mixed reality device 104 can determine and collect the joint data locally on the device; in these embodiments, device 104 can incorporate at least two cameras for parallax determination and implement skeletal tracking software. In other embodiments, mixed reality device 104 can receive the joint data from a separate skeletal tracking system or device.

The skeletal animation rig, which comprises joints/bones and weights that define how the movement of one joint/bone affects other joints/bones, can be predefined by an animator or may be generated by the skeletal tracking software itself (to avoid any discrepancies between the tracked joint data and the animation rig).

At block 304, mixed reality device 104 can place the skeletal animation rig at the position of individual 110 by matching the joints of the rig to the tracked joints of individual 110. Mixed reality device 104 can also scale each bone of the rig to match the individual's body proportions if needed (block 306).

Mixed reality device 104 can then attach the 3D mesh of the wearable customization at an appropriate point on the skeletal animation rig and skin the customization mesh on the rig such that, when the rig moves, the customization mesh will move with the rig and deform/change its shape in a correct manner (block 308). For example, if the wearable customization is a shirt, the shirt may be attached to one or more points (e.g., joints or bones) on the torso section of the skeletal animation rig and skinned over the torso section. Alternatively, if the wearable customization is a pair of pants, the pants may be attached to one or more points on the lower body of the skeletal animation rig and skinned over the lower body section. Generally speaking, the vertices of the customization mesh will be weighted based on certain joints/bones of the skeletal animation rig so that, when those joint/bones move, the customization mesh will deform accordingly.

As part of block 308, mixed reality device 104 can scale the customization mesh in accordance with the bones of the skeletal animation rig, thereby ensuring that the mesh is properly sized with respect to the rig and thus individual 110.

Once mixed reality device 104 has skinned the customization mesh on the skeletal animation rig, device 104 can render the skinned mesh using conventional graphics rendering techniques (block 310) and present the rendered mesh over individual 110 on display 108 (block 312). In cases where mixed reality device 104 incorporates a transparent display, device 104 may render the mesh using a particular set of colors or at a certain intensity/brightness threshold so that user 102's eyes can easily focus on the customization. Further, as part of the rendering at block 310, mixed reality device 104 may cull certain "inner" surfaces of the customization mesh that should be occluded by individual's 110 body and thus should not be made visible to device user 102 (e.g., the inside of a hat).

Upon presenting the rendered mesh on display 108, mixed reality device 104 can determine updated joint data for individual 110 (block 314), update the positioning/pose of the skeletal animation rig based on the updated joint data (block 316), and return to block 310 to re-render/re-display the customization mesh. Finally, device 104 can repeat blocks 310-316 in a continuous loop, which will cause the wearable customization to move/deform in real-time in display 108 in accordance with the movements of the skeletal animation rig (and thus, the movements of individual 110).

5. Rendering Floating Customizations

Figure 4:
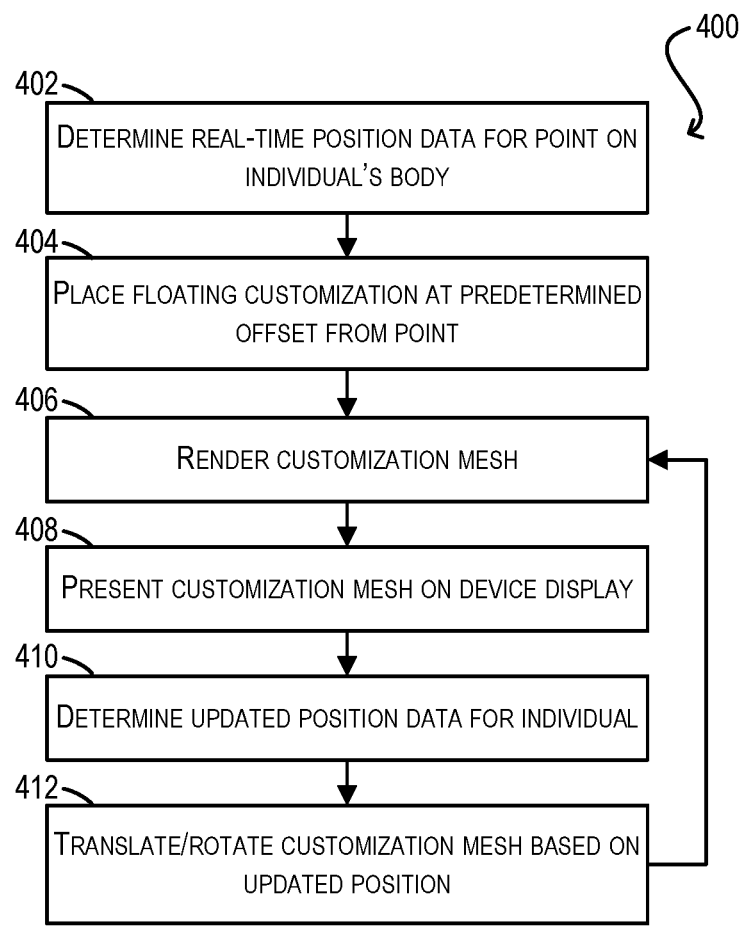
FIG. 4 depicts a workflow for rendering floating customizations according to certain embodiments.

FIG. 4 depicts a workflow 400 that can be performed by mixed reality device 104 for rendering a floating customization for individual 110 (per block 210 of FIG. 2) according to certain embodiments.

Starting with block 402, mixed reality device 104 can determine real-time position data for a predefined point on individual 110's body (e.g., the individual's head). This can be achieved via skeletal tracking or other techniques, such as recognizing and tracking the individual's face.

At block 404, mixed reality device 104 can place the floating customization at an offset from the point determined at block 402, where the offset is defined as part of the customization. For example, a floating animal familiar may be positioned slightly down and to the left of the individual's head, while a halo may be positioned directly above the individual's head.

At blocks 406 and 408, mixed reality device 104 can render and display the customization within display 108. Device 104 can then determine an updated position for individual 110 (block 410) and translate/rotate the floating customization accordingly (block 412). In certain embodiments, this translation/rotation can be performed by (1) calculating a movement direction vector (M) for individual 110 by subtracting the individual's previous position (i.e., $M=P_n-P_{n-1}$) from the individual's most recent position ($P_n$), and (2) updating the position/rotation of the customization mesh to move and face in the direction of M.

Finally, mixed reality device can repeat blocks 406-412 in a continuous loop so that the floating customization will appear to follow individual 110 on display 108 as the individual moves through the environment.

As mentioned previously, in some cases a floating customization may encounter environmental obstacles that block its path, such as doorways, furniture, and so on. To address this, mixed reality device 104 can define a collider volume around the customization mesh that is larger than the mesh itself. If device 104 determines that the collider volume will collide with an obstacle (in view of the translation/rotation information calculated at block 412 and spatial mapping data maintained by the device), the device can rotate the position of the customization object in a direction that is clear of the obstacle. Further, once the obstacle is no longer in the path of the collider volume, mixed reality device 104 can move the customization mesh back to its original position relative to individual 110. In this way, device 104 can route the customization around the obstacle and avoid clipping issues that may break device user 102's sense of immersion in the mixed reality environment. If for some reason a given obstacle cannot be avoided, mixed reality device 104 can temporarily reduce the opacity of the customization mesh in display 108 so that it fades out of visibility while it passes through the obstacle.

6. Other Features/Enhancements

In addition to the various aspects described above, certain implementations of the present disclosure may also include the following features/enhancements.

6.1 Device-to-Device Syncing

With this feature, mixed reality device 104 can automatically sync customization-related data, such as user IDs, user locations, customization definitions, etc., to other mixed reality devices in the vicinity of device 104. This can advantageously reduce the amount of communication needed between each mixed reality device and server(s) 116 and ensure that each device presents a consistent representation of the customizations present in the environment to its respective device user.

6.2 Customization Permissions

With this feature, at the time of setting up his/her customizations, individual 110 can assign appearance customizations to particular groups or individuals such that only those groups or individuals are allowed to view the customizations. In various embodiments, these permissions can be stored on server(s) 116 along with the customization information.

Then, at the time mixed reality device 104 requests from server(s) 116 the appearance customizations of individual 110 for rendering and presentation to device user 102, the server(s) can provide to device 104 only those customizations that device user 102 is authorized to view. For example, if individual 110 has defined customization A has being visible to all, customization B as being visible only to a group G1 (which does not include device user 102), and customization C as being visible only to a group G2 (which does include device user 102), the server(s) will provide customizations A and C to device 104. Thus, this feature provides individual 110 control and flexibility over who may view his/her appearance customizations.

7. Example Computing Device

Figure 5:
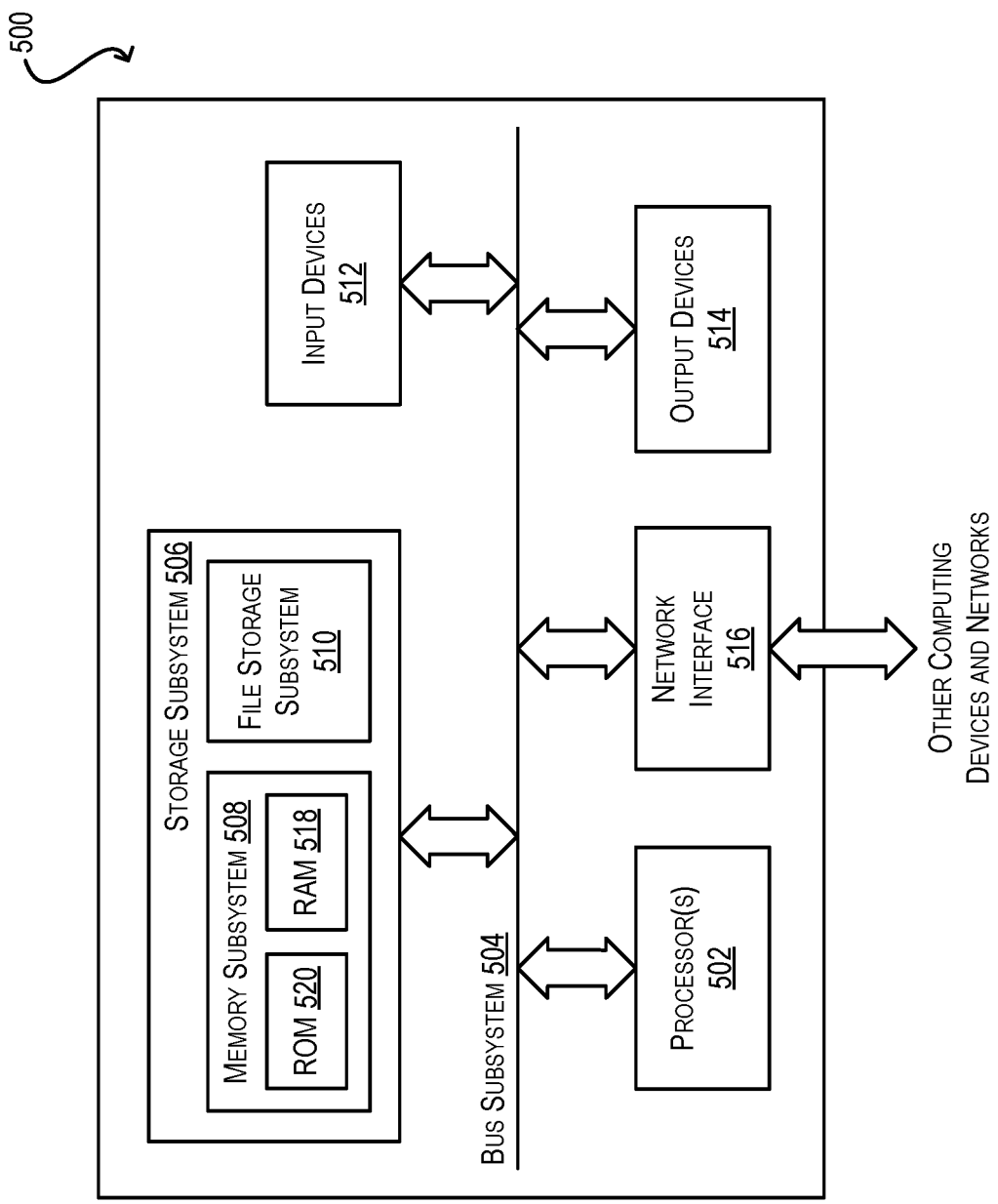
FIG. 5 is a simplified block diagram of a computing device according to certain embodiments.

FIG. 5 is a simplified block diagram of an example computing device 500 that may be used to implement mixed reality device 104 of FIG. 1 according to certain embodiments. As shown in FIG. 5, computing device 500 includes one or more processors 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computing device 500 communicate with each other as intended. Although bus subsystem 504 is shown schematically as a single bus, alternative embodiments of the bus subsystem can utilize multiple busses.

Network interface subsystem 516 can serve as an interface for communicating data between computing device 500 and other computer systems or networks. Embodiments of network interface subsystem 516 can include, e.g., an Ethernet module, a Wi-Fi and/or cellular connectivity module, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computing device 500.

User interface output devices 514 can include a display subsystem and/or non-visual output devices such as audio output devices, etc. The display subsystem can include, e.g., a non-transparent display screen (e.g., LCD or OLED) or a transparent display screen that enables a user to simultaneously view the real world and computer-generated elements/objects within the display. In general, use of the term "output device" is intended to include all possible types of devices and mechanisms for outputting information from computing device 500.

Storage subsystem 506 includes a memory subsystem 508 and a file/disk storage subsystem 510. Subsystems 508 and 510 represent non-transitory computer-readable storage media that can store program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computing device 500 is illustrative and other configurations having more or fewer components than device 500 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A mixed reality device comprising:
a camera;
a display;
a processor; and
a computer readable storage medium having stored thereon program code that, when executed by the processor, causes the processor to:
detect presence of a real-world individual in a field of view of the camera;
determine whether the real-world individual is associated with one or more appearance customizations; and
if the real-world individual is associated with one or more appearance customizations, render the one or more appearance customizations on top of, or nearby, the real-world individual on the display, wherein the one or more appearance customizations include a floating customization defined by a three-dimensional (3D) mesh, wherein the 3D mesh of the floating customization is surrounded by a collider volume, and wherein when the processor determines that the collider volume will collide with an environmental obstacle, the 3D mesh is rendered at a lower opacity as the collider volume passes through the environmental obstacle.

2. The mixed reality device of claim 1 wherein the one or more appearance customizations further include a wearable customization, and wherein the rendering causes a user of the mixed reality device to perceive the real-world individual as wearing the wearable customization.

3. The mixed reality device of claim 2 wherein the wearable customization is a piece of clothing or a wearable accessory.

4. The mixed reality device of claim 1 wherein the rendering causes a user of the mixed reality device to perceive the real-world individual as being followed by or connected with the floating customization.

5. The mixed reality device of claim 4 wherein the floating customization is a floating object or a visual effect around the real-world individual.

6. The mixed reality device of claim 1 wherein if the real-world individual is not associated with any appearance customizations, the real-world individual is presented in an unaltered form on the display.

7. The mixed reality device of claim 1 wherein the one or more appearance customizations are selected or defined by the real-world individual and stored on a server.

8. The mixed reality device of claim 7 wherein the program code further causes the processor to, prior to rendering the one or more appearance customizations:
retrieve definitions of the one or more appearance customizations from the server.

9. The mixed reality device of claim 1 wherein the one or more appearance customizations further include a wearable customization defined by another 3D mesh, and wherein rendering the wearable customization comprises:
determining real-time joint data for the real-world individual corresponding to joints on a humanoid skeletal animation rig;
placing the skeletal animation rig at a position of the real-world individual based on the real-time joint data;
skinning the 3D mesh of the wearable customization on the skeletal animation rig;
rendering the 3D mesh of the wearable customization; and
presenting the rendered 3D mesh of the wearable customization on the display.

10. The mixed reality device of claim 9 wherein rendering the wearable customization further comprises:
scaling one or more bones of the skeletal animation rig to match the real-world individual's body proportions.

11. The mixed reality device of claim 10 wherein rendering the wearable customization further comprises:
scaling the 3D mesh of the wearable customization to match the skeletal animation rig.

12. The mixed reality device of claim 9 wherein rendering of the wearable customization further comprises:
determining updated joint data for the real-world individual;
updating the skeletal animation rig based on the updated joint data; and
re-rendering the 3D mesh of the wearable customization.

13. The mixed reality device of claim 1 wherein rendering the floating customization comprises:
determining real-time position data for a point on the real-world individual's body;
placing the 3D mesh of the floating customization at a predetermined offset from the point;
rendering the 3D mesh; and
presenting the rendered 3D mesh on the display.

14. The mixed reality device of claim 13 wherein rendering the floating customization further comprises:
determining updated position data for the point;

translating and rotating the 3D mesh of the floating customization based on the updated position data; and re-rendering the 3D mesh.

15. The mixed reality device of claim 1 wherein when the processor determines that the collider volume will collide with an environmental obstacle, the 3D mesh is rotated in a direction that is clear of the environmental obstacle.

16. The mixed reality device of claim 1 wherein the one or more appearance customizations are associated with a permission indicating that a user of the mixed reality device is authorized to view the one or more appearance customizations.

17. A method comprising:

detecting, by a mixed reality device, presence of a real-world individual in a field of view of the mixed reality device;

determining whether the real-world individual is associated with one or more appearance customizations; and if the real-world individual is associated with one or more appearance customizations, rendering the one or more appearance customizations on top of, or nearby, the real-world individual on a display of the mixed reality device, wherein the one or more appearance customizations include a floating customization defined by a three-dimensional (3D) mesh, wherein the 3D mesh of the floating customization is surrounded by a collider volume, and wherein when the processor determines that the collider volume will collide with an environmental obstacle, the 3D mesh is rendered at a lower opacity as the collider volume passes through the environmental obstacle.

18. A non-transitory computer readable storage medium having stored thereon program code executable by a mixed reality device, the program code causing the mixed reality device to:

detect presence of a real-world individual in a field of view of the mixed reality device;

determine whether the real-world individual is associated with one or more appearance customizations; and if the real-world individual is associated with one or more appearance customizations, render the one or more appearance customizations on top of, or nearby, the real-world individual on a display of the mixed reality device, wherein the one or more appearance customizations include a floating customization defined by a three-dimensional (3D) mesh, wherein the 3D mesh of the floating customization is surrounded by a collider volume, and wherein when the processor determines that the collider volume will collide with an environmental obstacle, the 3D mesh is rendered at a lower opacity as the collider volume passes through the environmental obstacle.

* * * * *